(12) United States Patent
Yim et al.

(10) Patent No.: US 8,464,978 B2
(45) Date of Patent: Jun. 18, 2013

(54) COUNTER-ROTATIONAL INERTIAL CONTROL OF ROTORCRAFT

(75) Inventors: Mark Yim, St. Davids, PA (US); Christopher Everett Thorne, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 397 days.

(21) Appl. No.: 12/761,842

(22) Filed: Apr. 16, 2010

(65) Prior Publication Data

US 2010/0264256 A1 Oct. 21, 2010

Related U.S. Application Data

(60) Provisional application No. 61/169,916, filed on Apr. 16, 2009.

(51) Int. Cl.
*B64C 27/08* (2006.01)
*B64C 29/00* (2006.01)

(52) U.S. Cl.
USPC ..................................... 244/17.23; 244/23 C

(58) Field of Classification Search
USPC ............. 244/17.23, 23 C, 12.2, 17.11, 17.25, 244/17.27; 416/120, 124, 126, 128
See application file for complete search history.

(56) References Cited

U.S. PATENT DOCUMENTS

| | | | | | |
|---|---|---|---|---|---|
| 1,015,656 | A | * | 1/1912 | Valentine | 244/17.23 |
| 1,868,392 | A | * | 7/1932 | Leffert | 244/17.23 |
| 2,711,295 | A | * | 6/1955 | Peterson | 244/7 R |
| 3,041,012 | A | * | 6/1962 | Gibbs | 244/17.23 |
| 3,633,849 | A | * | 1/1972 | Kling | 244/12.2 |
| 3,838,835 | A | * | 10/1974 | Kling | 244/23 C |
| 3,997,131 | A | * | 12/1976 | Kling | 244/23 R |
| 5,058,824 | A | | 10/1991 | Cycon et al. | |
| 5,653,404 | A | * | 8/1997 | Ploshkin | 244/12.2 |
| 5,791,592 | A | | 8/1998 | Nolan et al. | |
| 6,719,244 | B1 | | 4/2004 | Gress | |
| 7,407,132 | B2 | * | 8/2008 | Kirjavainen | 244/23 R |
| 7,410,123 | B2 | * | 8/2008 | Nunnally | 244/23 C |
| 2006/0102777 | A1 | | 5/2006 | Rock | |

* cited by examiner

*Primary Examiner* — Tien Dinh
(74) *Attorney, Agent, or Firm* — RatnerPrestia

(57) ABSTRACT

A rotorcraft with two counter-rotating rotors and method for inertially controlling the rotorcraft. The rotorcraft includes a hinged frame configured such that at least one inter-rotor angle of the two counter-rotating rotors is controlled by at least one actuated hinge of the hinged frame and the rotational axes of the two counter-rotating rotors are substantially collinear when the actuated hinge is in a fully open position. The sum of the magnitudes of torque applied to the two counter-rotating rotors is varied to control the lift of the rotorcraft. The difference of the magnitudes of torque applied to the two counter-rotating rotors is varied to control the yaw of the rotorcraft. The at least one inter-rotor angle is varied using the at least one actuated hinge to control the pitch and/or roll of the rotorcraft.

28 Claims, 11 Drawing Sheets

COUNTER-ROTATIONAL INERTIAL CONTROL OF ROTORCRAFT

FIELD OF THE INVENTION

The present invention concerns rotorcraft with counter-rotating rotors and inertial control of such rotorcraft. In particular, these methods may be used for improved performance, simplified control, and simplified manufacture of these rotorcraft.

BACKGROUND OF THE INVENTION

Coaxial rotorcraft have been known for many years. However, because of difficulties involved in the control of cyclic and collective pitch of rotor blades in a coaxial configuration, development of this type of aircraft has heretofore been limited. Conventional coaxial designs provide roll, pitch and yaw control by providing control input linkages for cyclic and collective pitch to both an upper rotor and a lower rotor of a coaxial rotor set. This has conventionally involved providing at least two swash plates. One below, and one above, the lower rotor, to transfer control inputs past the lower rotor to the upper rotor, which is rotating in the opposite direction.

Several successful coaxial designs have been developed, for example, those by Nikolai Kamov and the Kamov Design Bureau of the former Soviet Union. The Kamov organization continues to produce coaxial rotorcraft in the Russian Federation. Other coaxial designs exist, for example a small coaxial unpiloted craft developed by United Technologies Corporation of Hartford, Conn. An example of the control system for this latter craft is disclosed in U.S. Pat. No. 5,058,824.

Coaxial designs are advantageous because they eliminate the need for a tail rotor, and are generally more efficient. With a coaxial design, one way of providing yaw control is to provide a differential collective blade pitch control. Pitch is increased in one rotor, and decreased in the other, to unbalance torque. Another way of providing yaw control is to place one or more airfoils in the rotor set downwash. The airfoils are tiltable with respect to the downwash. The airfoils, nominally set to provide minimal air resistance in the downwash, intercept and redirect the downwash from the rotor set by tilting in one direction or the other from this initial position. This creates a reaction force vector at a location away from a yaw axis of rotation of the airframe and tends to yaw the airframe right or left depending on which way the airfoils are tilted. An example of such a system is disclosed in U.S. Pat. No. 5,791,592, issued Aug. 11, 1998 to Nolan, et al. In the Nolan system, there is no cyclic blade pitch control, as pitch and roll control are provided by tilting the rotor set with respect to the airframe; thus, the thrust vector from the rotor set is deflected with respect to the airframe to pitch and roll the aircraft.

It has been recognized that instead of a differential collective blade pitch control where the blade pitch of one rotor is increased as that of the other is decreased, and vice versa, by the same amount, that collective blade pitch control inputs of different amounts can be made to the respective rotors of the rotor set. In one example, a single collective blade pitch control of one rotor only can provide a yaw attitude control input for the coaxial rotorcraft a coaxial rotorcraft. Commensurate potential advantages of performance achievable for potentially lower cost also argue for simplification in design.

In another example, as described in U.S. Appl. Pub. No. 2006/0102777, a control system for a rotorcraft having a coaxial rotor set including a first rotor carried by a first drive shaft, and a second counter-rotating rotor carried by a second drive shaft, has a collective pitch control which provides a yaw attitude control input via a collective control input to one rotor, without providing a collective control input to the other rotor. The rotorcraft can have another collective control system which is essentially independent of the yaw control collective, providing a separate control input for rotor thrust and a separate control input for yaw. This can still be simpler than providing a differential collective where one increases while the other decreases by the same amount. Common to these is that a yaw attitude control input is provided by enabling a different blade pitch magnitude for the first rotor as compared to the second rotor, thereby unbalancing the torque forces in the coaxial rotor set.

One implementation of this prior art control system is to provide collective control on only one rotor of the set, either the upper rotor or the lower rotor. A cyclic pitch control can be provided to enable pitch and roll attitude control inputs. This cyclic pitch control can also be limited to one rotor of the rotor set in one implementation; and in one implementation it can be the same rotor to which a collective control is applied.

In other implementations of this prior art control system, yaw control can be supplemented by a tail rotor. Such a tail rotor does not draw power constantly, but only for brief periods of time in order to provide yaw control. For at least this reason, the tail rotor can be small, and can comprise a ducted fan. Moreover, in further detail, variations can include replacing the tail rotor with an air jet and providing yaw paddles to supplement yaw control and to provide directional stability.

These prior art control systems rely on aerodynamic effects to provide lift, yaw, pitch, and roll control of the rotorcraft. Exemplary embodiments of the present invention include inertial control approaches that may greatly simplify construction and control algorithms of rotorcraft.

SUMMARY OF THE INVENTION

An exemplary embodiment of the present invention is a rotorcraft, including: a first motor coupled to a first rotor, the first rotor being a right-hand rotor and a second motor coupled to a second rotor, the second rotor being a left-hand rotor. The rotorcraft also includes a hinged frame, a first motor mount configured to rigidly hold the first motor, a second motor mount configured to rigidly hold the second motor, and at least one actuated hinge. The at least one actuated hinge is for varying at least one inter-rotor angle of the first and second rotors. The at least one actuated hinge is configured such that the rotational axes of the first and second rotors are substantially collinear when the at least one actuated hinge is in a fully open position. The rotorcraft further includes control circuitry coupled to the first motor, the second motor, and the at least one actuated hinge.

Another exemplary embodiment of the present invention is a rotorcraft, including: a first motor coupled to a housing; a first rotor coupled to the first motor by a first transmission, the first rotor being a right-hand rotor; a second motor coupled to the housing; and a second rotor coupled to the second motor by a second transmission, the second rotor being a left-hand rotor. The rotorcraft also includes a hinged frame, a first rotor mount configured to rigidly hold the first rotor, a second rotor mount configured to rigidly hold the second rotor, and at least one actuated hinge coupled to the housing. The at least one actuated hinge is disposed between the first rotor mount and the second rotor mount to vary at least one inter-rotor angle of the first and second rotors. The at least one actuated hinge is also configured such that the rotational axes of the first and second rotors are substantially collinear when the actuated hinge is in a fully open position. The rotorcraft further includes control circuitry coupled to the first motor, the second motor, and the at least one actuated hinge.

A further exemplary embodiment of the present invention is a method for inertially controlling a rotorcraft with two counter-rotating rotors. The rotorcraft includes a hinged frame configured such that at least one inter-rotor angle of the two counter-rotating rotors is controlled by at least one actuated hinge of the hinged frame and the rotational axes of the two counter-rotating rotors are substantially collinear when the actuated hinge is in a fully open position. The sum of magnitudes of torque applied to the two counter-rotating rotors is varied to control a lift of the rotorcraft. The difference of the magnitudes of torque applied to the two counter-rotating rotors is varied to control a yaw of the rotorcraft. One of the at least one inter-rotor angle is varied using one of the at least one actuated hinge to control one of a group consisting of the pitch and the roll of the rotorcraft.

Yet another exemplary embodiment of the present invention is a rotorcraft, including: a first motor coupled to a first rotor, the first rotor being a right-hand rotor; and a second motor coupled to a second rotor concentric with the first rotor, the second rotor being a left-hand rotor. The rotorcraft also includes a hinged frame, a first motor mount configured to rigidly hold the first motor, a second motor mount configured to rigidly hold the second motor, a first actuated hinge to vary an inter-rotor angle of the first rotor, and a second actuated hinge to vary an inter-rotor angle of the second rotor. The first and second actuated hinges are configured such that the first rotor and second rotor are substantially coplanar and the rotational axes of the first and second rotors are substantially collinear when the first and second actuated hinges are a fully open position. The rotorcraft further includes control circuitry coupled to the first motor, the second motor, and the first and second actuated hinges.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawing are the following figures.

DETAILED DESCRIPTION OF THE INVENTION

The exemplary embodiments of the present invention use inertia, rather than aerodynamics, to control the pitch and roll of a rotorcraft. Suitable rotorcraft for use with the present invention include, for example, vertical take-off and landing (VTOL) aircrafts. This approach simplifies the construction of exemplary rotorcraft that do not have complex interactions between various rotating components. Additionally, this approach enables larger and faster control authority over the attitude of the rotorcraft. Exemplary methods of inertial attitude control according to the present invention result in a simplified control model for rotorcraft. The examples of inertial control described herein may rely on gyroscopic control to command a rotorcraft. This simplified control model may allow for improved control of rotorcraft by either human pilots or automated flight control systems.

Figure 1:
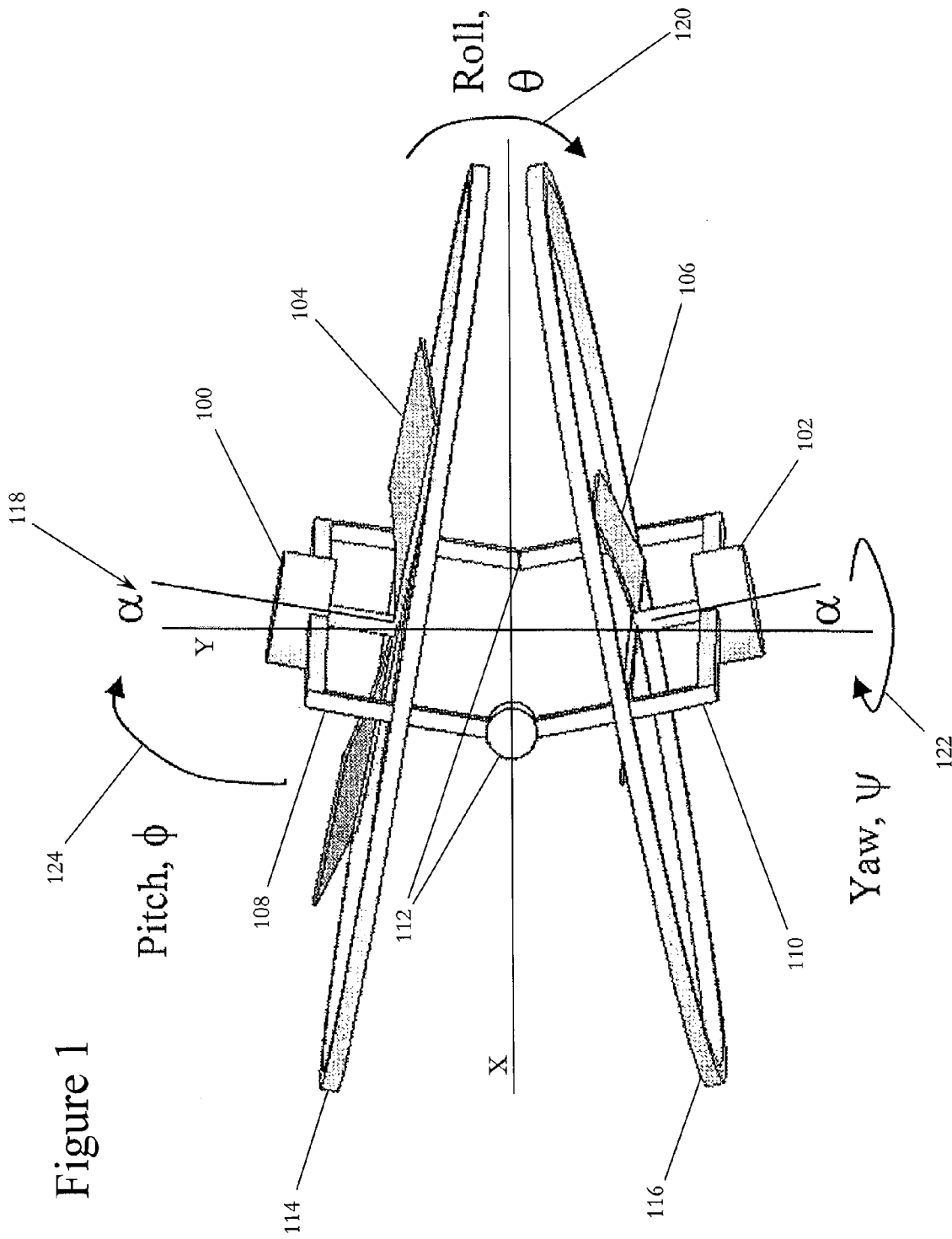
FIG. 1 is a perspective drawing illustrating an exemplary rotorcraft with two counter-rotating rotors according to the present invention.

FIG. 1 illustrates an exemplary rotorcraft according to the present invention. This exemplary rotorcraft includes first motor 100, which is coupled to first rotor 104, and second motor 102, which is coupled to second rotor 106. One of rotors 104 and 106 is a right-handed rotor and the other is a left-handed rotor. The handedness of a rotor is based on the direction, clockwise or counter-clockwise, that the rotor must be driven to generate lift. Thus, in operation, the two rotors 104 and 106 are driven in opposite directions, or counter-rotated, by motors 100 and 102, respectively, to provide lift.

In this exemplary embodiment, the two motors 100 and 102 are mounted on a hinged frame that includes: first motor mount 108, which is configured to rigidly hold first motor 100; second motor mount 110, which is configured to rigidly hold second motor; and at least one actuated hinge 112. While motor mounts 108 and 110 are depicted as being directly attached to the hinged frame, other configurations are contemplated wherein motor mounts 108 and 110 may be attached to alternate frames. As illustrated in FIG. 1, the hinged frame is configured such that first rotor 104 (and first motor 100) is disposed above second rotor 106 (and second motor 102) when the rotorcraft is in operation. However, as will be discussed in detail below, rotors 104 and 106 may be configured to be concentric.

Actuated hinge(s) 112 is/are disposed between first motor mount 108 and second motor mount 110 such that it may be used to vary at least one inter-rotor angle between the rotational axes of first rotor 104 and second rotor 106. Actuated hinge(s) 112 is/are configured such that the rotational axes of the two rotors are substantially collinear when the actuated hinge is in a fully open position. FIG. 1 illustrates the exemplary rotorcraft with an actuated hinge 112 partially actuated, such that inter-rotor angle 118, $\alpha$, is formed in the X-Y plane between the rotational axis of first rotor 104 and the Y-axis, and also between the rotational axis of second rotor 106 and the Y-axis. Thus, in FIG. 1, actuated hinge 112 is actuated so that the inter-rotor angle between the rotational axes of first rotor 104 and second rotor 106 is $2\alpha$. However, other definitions for the inter-rotor angle are contemplated. As described above, the inter-rotor angle of the rotorcraft may be defined as the angle between the rotational axes of the first and second rotors 104 and 106, $2\alpha$. However, the inter-rotor angle for a single rotor may optionally be defined as the angle between the rotational axis of one of the first or second rotors 104 or 106 and the Y-axis, or any other line perpendicular to the X-Z plane (Z-axis not shown).

Though FIG. 1 depicts only one actuated hinge, multiple hinges may be used to vary multiple inter-rotor angle between the rotational axes of first rotor 104 and second rotor 106. For example, two actuated hinges 112 may be used to vary the inter-rotor angle of rotors 104 and 106. A first actuated hinge 112 may be used to vary an inter-rotor angle of rotors 104 and 106 in the X-Y plane, as depicted. A second actuated hinge 112 may be used to vary an inter-rotor angle of rotors 104 and 106 in the Y-Z plane perpendicular to the X-Y plane. While in this example the multiple inter-rotor angles are perpendicular to each other, it is understood that the multiple actuated hinges could vary multiple inter-rotor angles having any non-coplanar relationship (i.e. two inter-rotor angles offset by 45 degrees with respect to the top of the rotorcraft).

Actuated hinge(s) 112 may be adapted to respond to electric servos, hydraulic actuators, shape memory actuators, electro-static actuators, or other means to provide torque to the at least one inter-rotor angle. Actuated hinge(s) 112 may comprise a universal joint having two or more degrees of freedom to allow actuated hinge(s) 112 to vary multiple inter-rotor angles between the rotational axes of first rotor 104 and second rotor 106.

Motors 100 and 102 may be electric, internal combustion, or other types of motors. It is desirable that these two motors be substantially similar in size and power. Further, it may be desirable that the combined moment of inertia of first motor 100 and first rotor 104 be similar to the combined moment of inertia of second motor 102 and second rotor 106. In this configuration, because rotors 104 and 106 are designed to counter-rotate in operation, the horizontal facing of the exemplary rotorcraft may be maintained by running motors 100 and 102 at the same rotational speed, and yaw 122, $\psi$, of the exemplary rotorcraft may be controlled by controlling the difference between the rotational speeds of motors 100 and 102. However, it may instead be desirable that the combined moment of inertia of first motor 100 and first rotor 104 be different from the combined moment of inertia of second motor 102 and second rotor 106. This configuration may enable the rotorcraft to achieve greater attitude stability during operation.

Exemplary rotorcraft according to the present invention also include control circuitry (not shown) that is coupled to first motor 100, second motor 102, and actuated hinge 112 to provide flight control. This coupling may be by direct electrical coupling or it may be accomplished wirelessly, mechanically (as in the case of the throttle of an internal combustion engine), or by other means. The control circuitry of the exemplary rotorcraft desirably includes flight control circuitry which is coupled to first motor control circuitry, second motor control circuitry, and hinge control circuitry. The first and second motor control circuitries control the operation of the first and second motors 100 and 102 and thereby control the torque applied to the first and second rotors 104 and 106. The first motor control circuitry is coupled to first motor 100 and adapted to control its rotational speed and thereby the rotational speed of rotor 104. The second motor control circuitry is coupled to second motor 102 and adapted to control its rotational speed and thereby the rotational speed of rotor 106. Motors 100 and 102 may include sensors to monitor their rotational speeds to provide feedback to first and second motor control circuitry, respectively, to improve control of their rotational speed. The hinge control circuitry is coupled to actuated hinge(s) 112 and adapted to control the inter-rotor angle(s). Actuated hinge(s) 112 may include a sensor to provide feedback regarding the inter-rotor angle.

The flight control circuitry is adapted to generate: lift control signals; yaw control signals; and one or both of pitch and roll control signals. The lift control signals are supplied to the first motor control circuitry and the second motor control circuitry to provide control of the lift of the rotorcraft based on the sum of the rotational speeds of rotors 104 and 106. The yaw control signals are also supplied to the first and second motor control circuitry to control yaw 122 of the rotorcraft based on the difference in the torque provided to rotors 104 and 106. Varying the speeds of rotors 104 and 106 creates a difference in the magnitudes of torque applied by the rotors 104 and 106 to the rotorcraft, which causes the rotorcraft to yaw. The pitch and/or roll control signals are supplied to the hinge control circuitry to control pitch 124 and/or roll 120 of the rotorcraft based on variations of the inter-rotor angle(s).

Varying one or more of the inter-rotor angles using the hinged frame provides a torque to both rotors 104 and 106 (and their corresponding motors 100 and 102). This torque is applied at a right angle to the angular momentum of each rotor. It is well known that, the application of a torque at an angle to the angular momentum of a rigid rotating body causes that body to respond by rotating along an axis that is orthogonal to both the axis of the angular momentum and the axis of the torque. This rule is employed, for example, by control moment gyroscopes (CMGs) in the control of spacecraft. In the example of FIG. 1, the torque applied by varying the inter-rotor angle in the X-Y plane by actuating the actuated hinge 112 of the hinged frame causes each motor/rotor pair to rotate about pitch 124, $\phi$, of the exemplary rotorcraft. Similarly, the torque applied by varying the inter-rotor angle in the Y-Z plane (not shown) by actuating another actuated hinge causes each motor-rotor pair to rotate about roll 120, $\theta$, of the exemplary aircraft. Because the torque applied to the first motor/rotor pair is opposite in sign to the torque applied to the second motor/rotor pair and the angular momenta of the motor/rotor pairs are opposite in sign, both motor/rotor pairs rotate in the same direction in response to the applied torque. Thus, pitch 124 or roll 120 of the exemplary rotorcraft may be controlled by actuating a single actuated hinge 112, or both pitch 124 and roll 120 may be controlled by actuating multiple actuated hinges 112 to vary perpendicular inter-rotor angles. Additionally, the angular speed at which hinges 112 are actuated may be varied in order to control the pitch 124 and roll 120 of the exemplary rotorcraft. The larger the angular speed at which a hinge 112 is actuated, the larger in magnitude the effect on pitch 124 or roll 120.

Where only one actuated hinge 112 is provided, only one of the pitch 124 and roll 120 of the rotorcraft may be controlled by varying the inter-rotor angle. In that configuration, the pitch or roll of the rotorcraft may be controlled by combining two or more motions. For example, roll 120, $\theta$, of the exemplary rotorcraft may be controlled by combined motions of pitch 124 and yaw 122. Starting from level hovering, rotating the rotorcraft 90° counterclockwise about its central axis as viewed from above (i.e. a 90° yaw), pitching the exemplary rotorcraft forward 10°, and rotating the rotorcraft back 90° clockwise about its central axis (−90° yaw) results in an orientation equivalent to rolling the rotorcraft left 10°. Similarly, the pitch 124 of the exemplary rotorcraft may be controlled by the combined motions of roll 120 and yaw 122. Starting from level hovering, rotating the rotorcraft 90° counterclockwise about its central axis as viewed from above (i.e. a 90° yaw), rolling the exemplary rotorcraft left 10°, and rotating the rotorcraft back 90° clockwise about its central axis (−90° yaw) results in an orientation equivalent to pitching the rotorcraft forward 10°.

The hinged frame of exemplary rotorcraft shown in FIG. 1 also includes rotor-guards 114 and 116. These rotor-guards 114 and 116 are aligned with the planes rotors 104 and 106, respectively, to help reduce the possibility of the rotors colliding with objects in the environment. Rotor-guards 114 and 116 may also be designed to contact one another when actuated hinge 112 is fully actuated to prevent a collision between counter-rotating rotors 104 and 106.

To focus attention on the inertial flight control components of exemplary embodiments of the present invention, FIG. 1 does not include a number of additional elements that may be included in exemplary rotorcraft according to the present invention. For example, the hinged frame of such an exemplary rotorcraft may also include a housing (not shown) to enclose the hinged frame assembly and configured such that the first and second rotors are ducted. Desirably, the housing may be coupled to actuated hinge 112. Ducting of counter-rotating rotors 104 and 106 may increase lift and/or improve stealth capabilities of the exemplary rotorcraft. Additionally, the hinged frame, actuated hinge 112, or housing of the hinged frame may provide a stable platform that may be coupled to a payload, which could include a pilot, one or more passengers, cargo and/or additional rotorcraft components, such as a fuel tank, a battery, sensors, and/or weapons.

Figure 2:
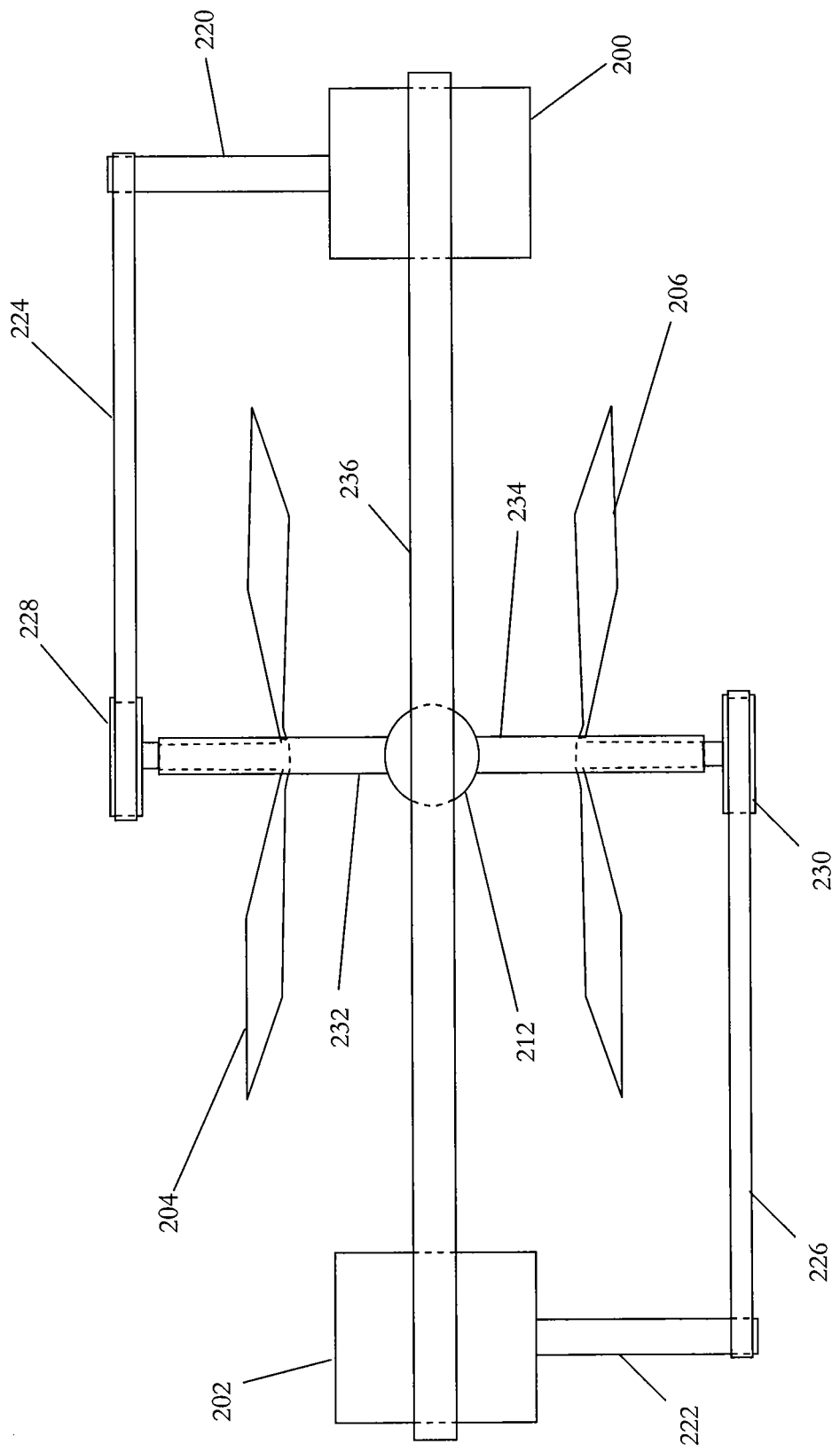
FIG. 2 is a side plan drawing illustrating another exemplary rotorcraft with two counter-rotating rotors according to the present invention.

FIG. 2 illustrates another exemplary rotorcraft with two counter-rotating rotors according to the present invention. In this exemplary embodiment, motors 100 and 102 are not mounted on the hinged frame of the rotorcraft as in the exemplary embodiment of FIG. 1. Instead motors 200 and 202 are mounted on housing 216, which is coupled to at least one actuated hinge 212 of the hinged frame. The hinged frame also includes rotor mounts 212 and 214, which are coupled to rotors 204 and 206, respectively. These rotor mounts each include a bearing that allows the corresponding rotor to rotate about its rotational axis while maintaining the orientation of this rotational axis relative to the rotor mount when the actuated hinge 212 is actuated.

Motors 200 and 202 are coupled to rotors 204 and 206 by a transmission. This transmission may include gears, pulleys, sprockets, chains, belts, drive shafts, joints, and/or other transmission means known in the art. In the exemplary embodiment illustrated in FIG. 2, the transmission coupling motor 200 to rotor 204 includes drive shaft 220, belt 224, and pulley 228 and the transmission coupling motor 202 to rotor 206 includes drive shaft 222, belt 226, and pulley 230. One skilled in the art will understand that various other suitable transmissions may be used to replace this exemplary belt-drive transmission illustrated in FIG. 2.

Varying an inter-rotor angle may generate less pitch or roll for an exemplary rotorcraft according to FIG. 2 than for an exemplary rotorcraft according to FIG. 1. This is because in the exemplary embodiment of FIG. 2 only rotors 204 and 206 are torqued and not motors 200 and 202. Therefore, the amount of angular momentum subject to the torque is likely to be less in this exemplary embodiment.

It is noted that, in an exemplary rotorcraft according to FIG. 2, when an inter-rotor angle is varied, the spatial relation between rotors 204 and 206 and their respectively motor 200 and 202 must be considered. Several approaches may be used. For example, in the exemplary rotorcraft of FIG. 2, actuated hinge(s) 212 could translate along a track in housing 236 so that the distance between shaft 220 and pulley 228 (and the distance between shaft 222 and pulley 220) remain constant as the inter-rotor angle is varied. In another example, motors 200 and 202 could translate along a track in housing 236 to accomplish the same thing. In other examples, the transmission may be used to compensate for changes in the relative positions of the motors and the rotors. For example, the belt-drive transmission of the exemplary rotorcraft of FIG. 2 may include tensioners to maintain the desired tension on belts 224 and 226 throughout the range of allowed inter-rotor angles, or belts 224 and 226 may merely have sufficient elasticity to compensate for any desired changes in the relative positions of the motors and the rotors.

FIGS. 3a-3h illustrate another exemplary rotorcraft according to the present invention. This exemplary rotorcraft includes a first motor 300 coupled to first rotor 304 and a second motor 302 coupled to second rotor 306. As with the prior embodiments, one of rotors 304 and 306 is a right-handed rotor and the other is a left-handed rotor.

In this exemplary embodiment, the two motors 300 and 302 are mounted on first motor mount 308 and second motor mount 310. Motor mounts 308 and 310 configured to rigidly hold the second motor. As illustrated in FIGS. 3b-3h, Motor mounts 308 and 310 are not mounted on hinged frame 350. Instead motor mounts 308 and 310 are mounted on inner and outer frames 314 and 315. However, other configurations are contemplated in which motor mounts 308 and 310 may be mounted directly on hinged frame 350. First and second actuated hinges 312 and 313 are mounted between hinged frame 350 and inner and outer frames 314 and 315.

As illustrated in FIGS. 3a-3h, the hinged frame 350 is configured such that first rotor 304 and second rotor 306 are concentric. It is desirable to configure the rotors 304 and 306 to be concentric to prevent a shift in the center of mass of the rotorcraft during operation. Each rotor 304 and 306 is constructed such that its center of mass is located in at the rotor's center, on the rotor's rotational axis. Configuring rotors 304 and 306 to be concentric ensures that the center of mass of the first rotor 304 is located at substantially the same position as the center of mass of the second rotor 306. The rotorcraft in this embodiment is further constructed such that the center of mass of the rotorcraft is located at the center of both rotors 304 and 306. Accordingly, the centers of mass of first and second rotors 304 and 306 are substantially located at the same position as a center of mass of the rotorcraft. In this configuration, the center of mass of the rotorcraft (and consequently rotors 304 and 306) will remain constant during operation of the rotorcraft. A constant center of mass of the rotorcraft is desirable to improve the stability of the rotorcraft when carrying a payload.

Figure 3A:
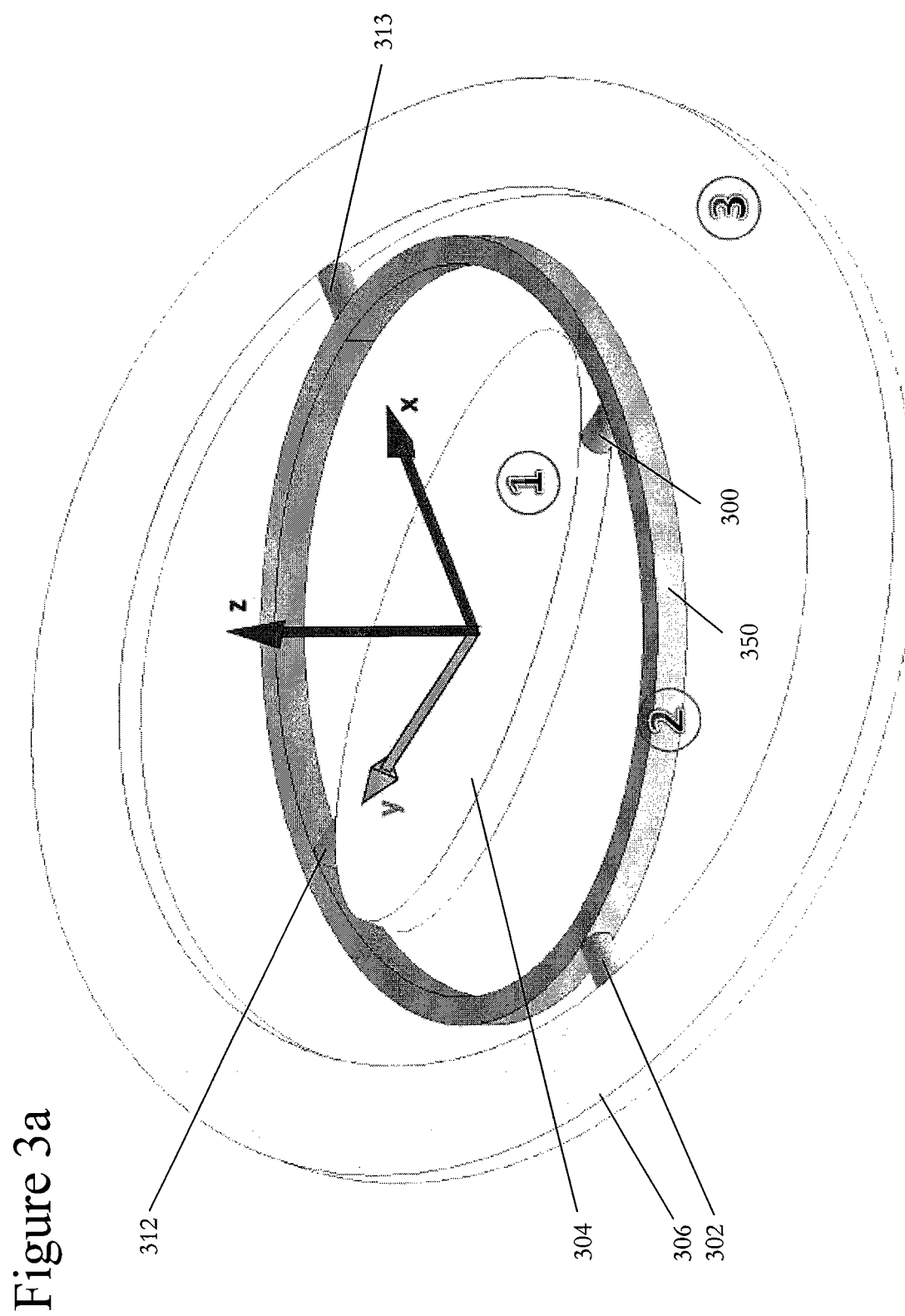
FIGS. 3a-3h are perspective and cross-sectional drawings illustrating yet another exemplary rotorcraft with two counter-rotating rotors according to the present invention.
Figure 3B:
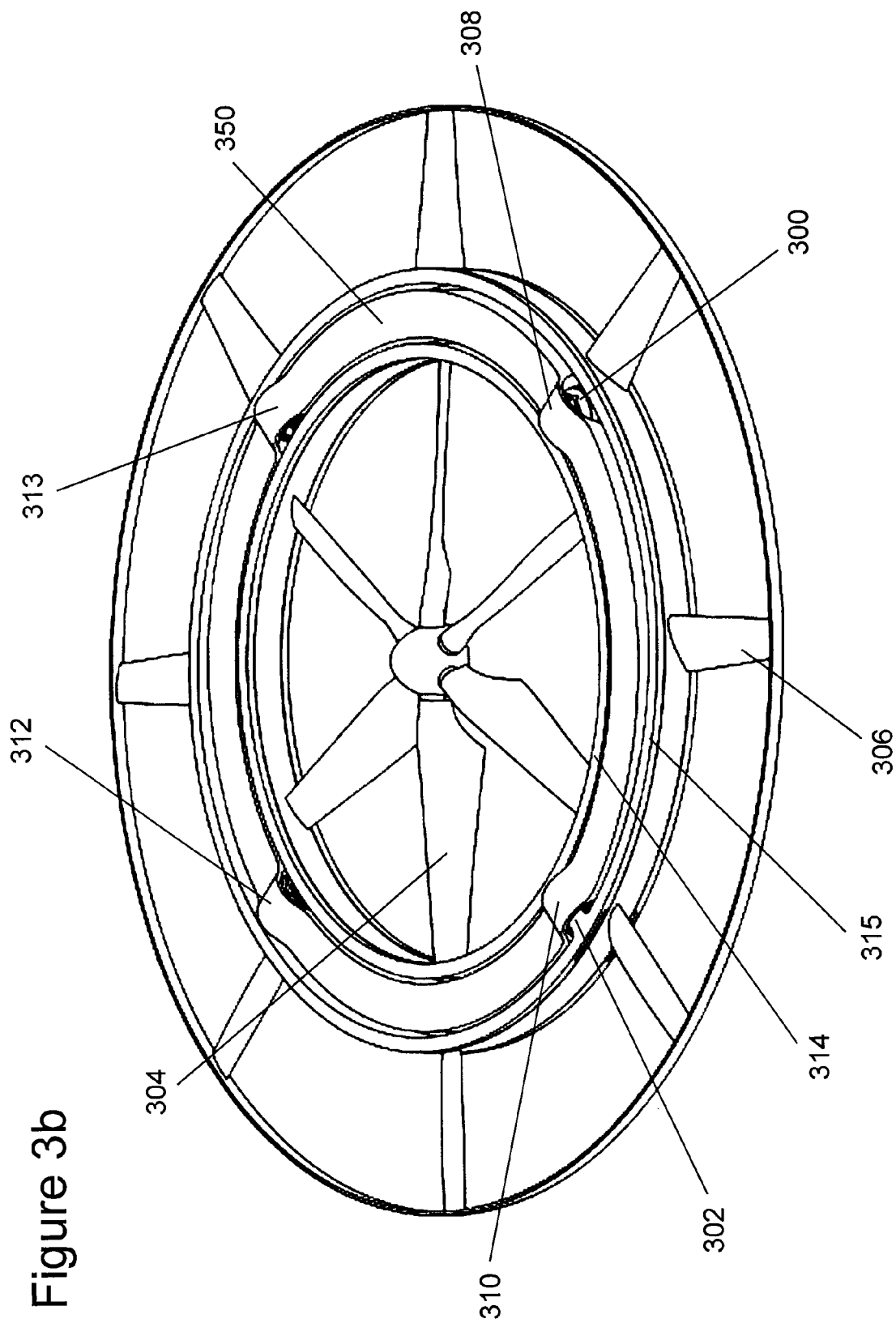
Figure 3C:
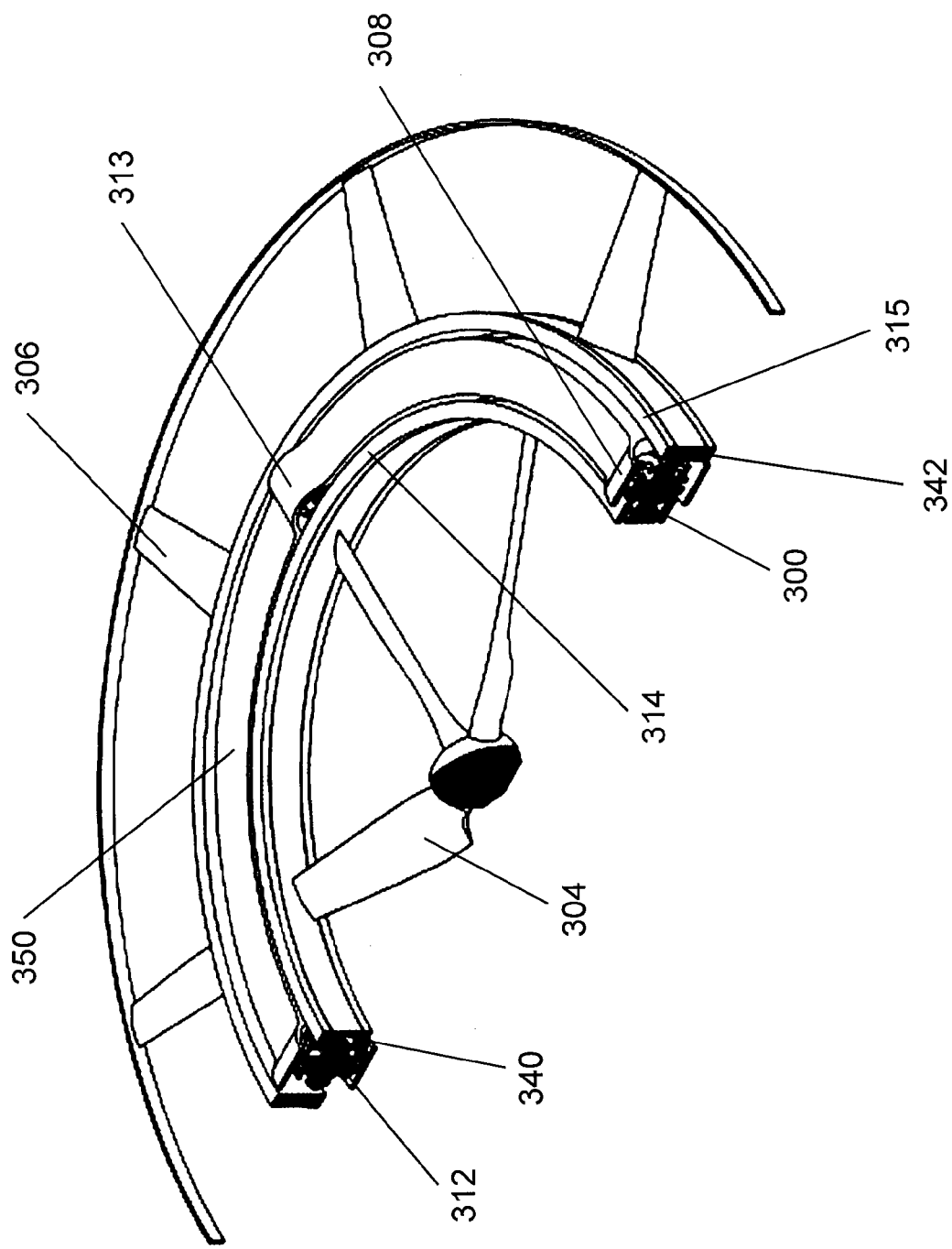
Figure 3D:
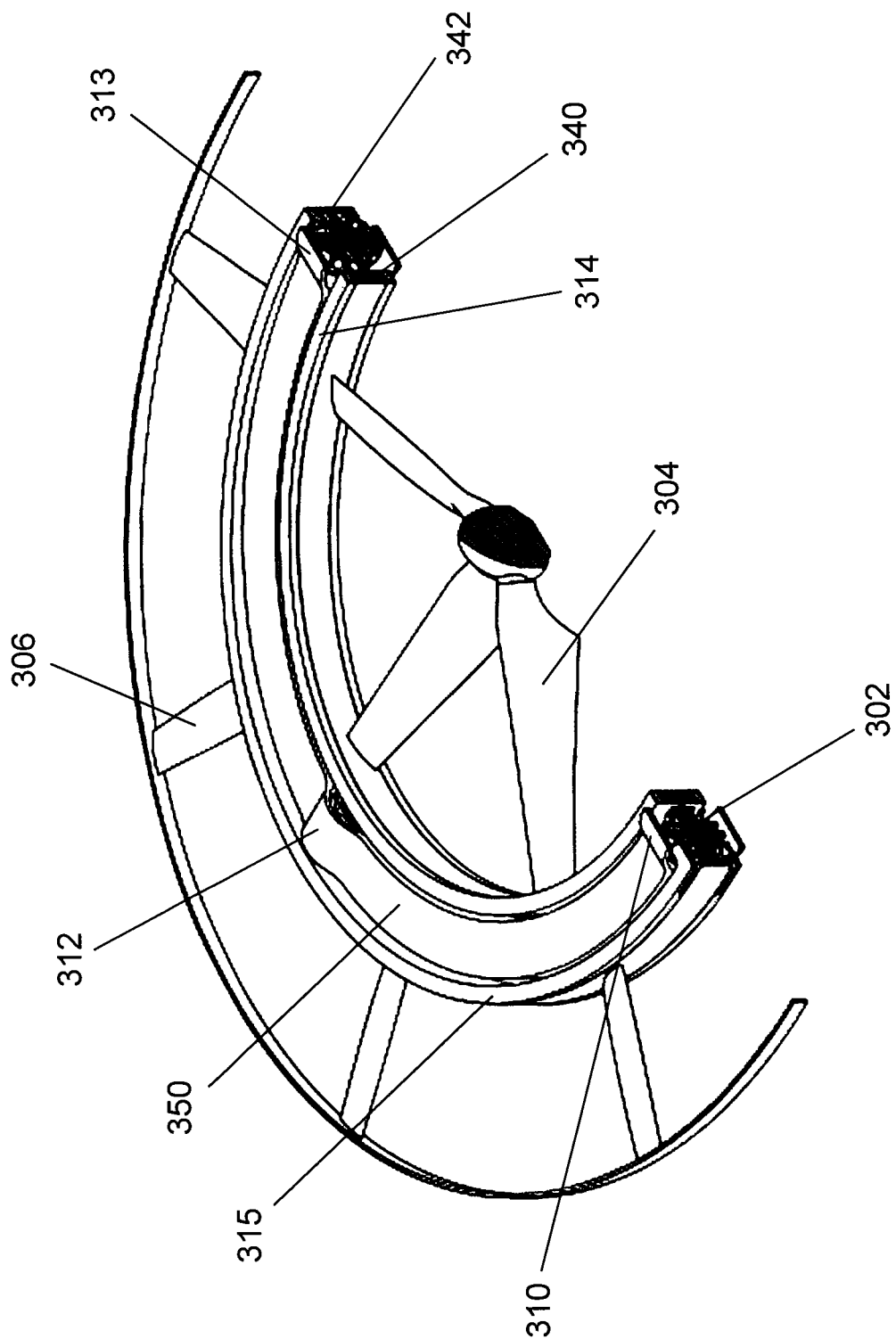
Figure 3E:
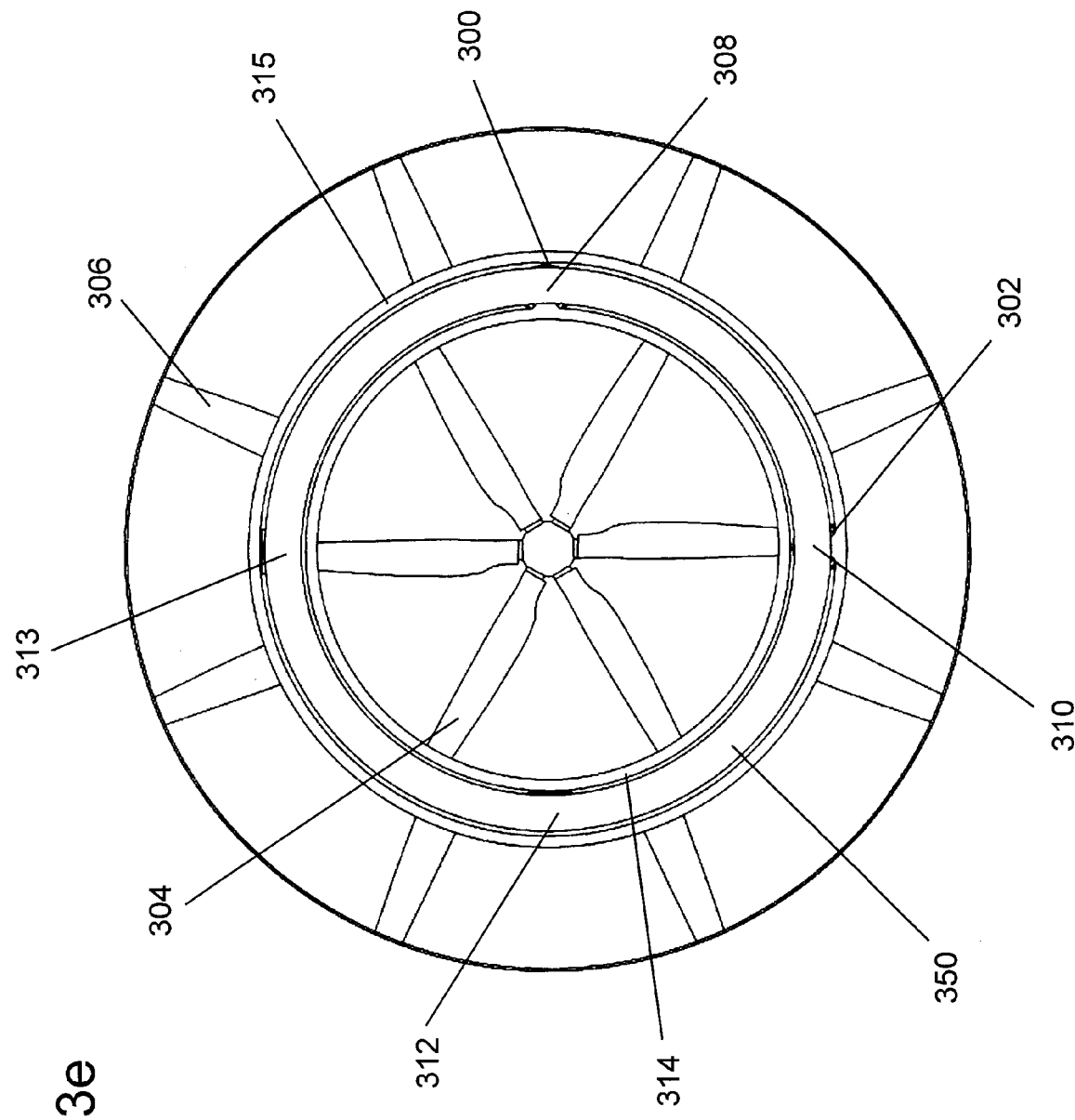
Figure 3F:
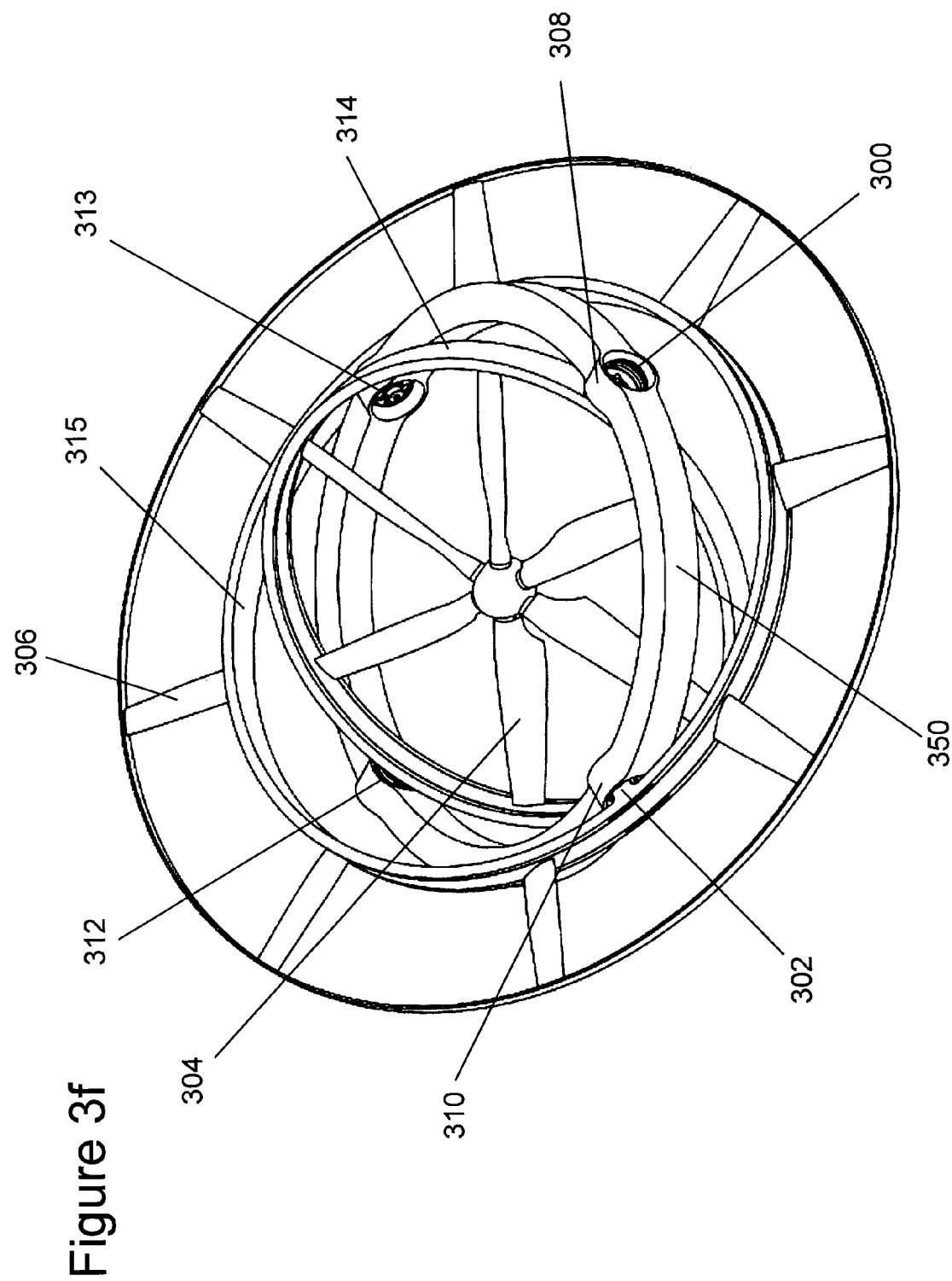
Figure 3G:
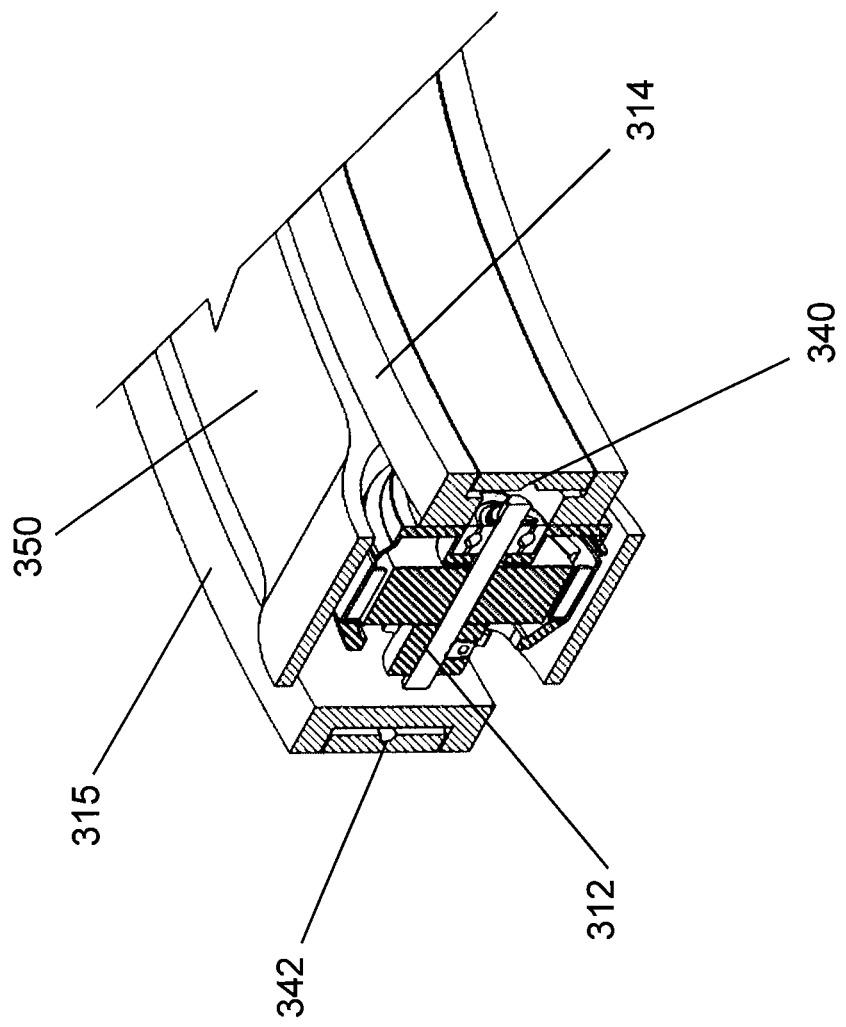
Figure 3H:
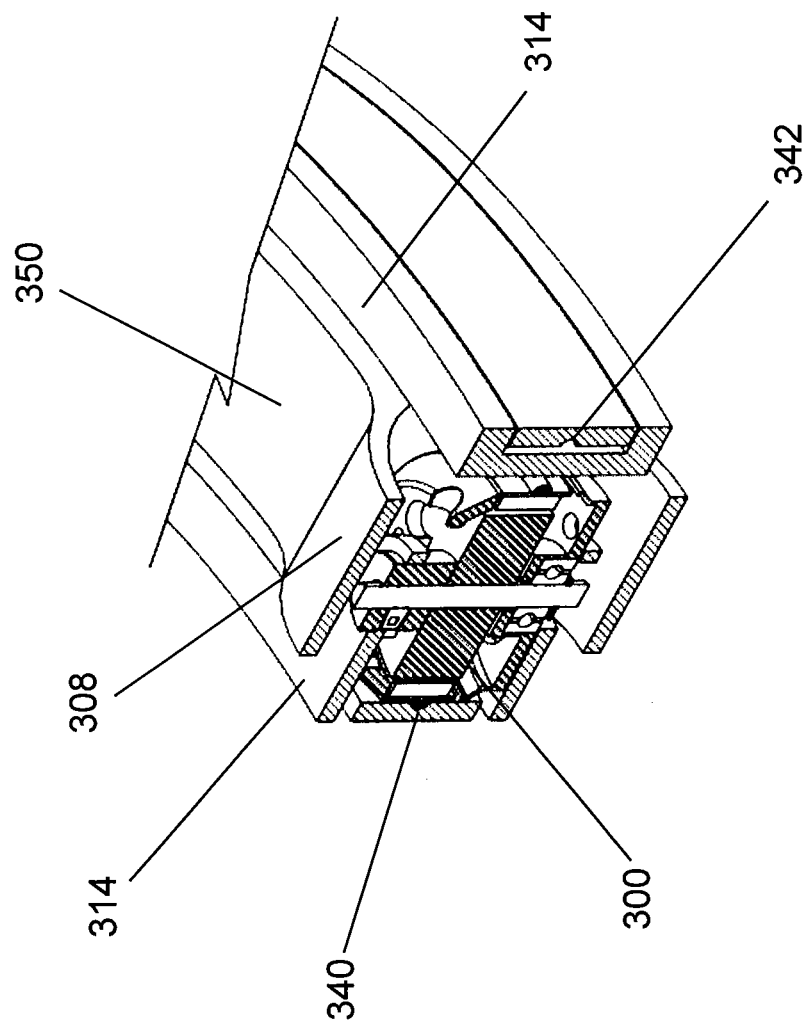

First actuated hinge 312 and second actuated hinge 313 are disposed such that they may be used to vary a first and second inter-rotor angle between the rotational axes of first rotor 304 and second rotor 306. In a preferred embodiment, the inter-rotor angle for a rotor may be defined as the angle between a rotational axis of the first or second rotor 304 or 306 and the Z-axis. As illustrated in FIGS. 3b-3h, first and second actuated hinges 312 and 313 are coupled to hinged frame 350 and inner and outer frames 314 and 315. In a preferred embodiment, each actuated hinge 312 and 313 includes a servo motor mounted to the hinge and configured to torque corresponding inner and outer frame 314 and 315, respectively, relative to hinged frame 350. Bearings 340 and 342 are configured within inner and outer frames 314 and 315. Inner and outer frames 314 and 315 transmit the torque applied by the servo motors of actuated hinges 312 and 313 to bearings 340 and 342, causing rotors 304 and 306 to rotate. This rotation caused by actuated hinges 312 and 313 varies the inter-rotor angle between rotors 304 and 306. As illustrated in FIG. 3a, first actuated hinge 312 may be used to vary a first inter-rotor angle in the X-Z plane, while second actuated hinge 313 may be used to vary a first inter-rotor angle in the Y-Z plane. Actuated hinges 312 and 313 are configured such that the rotational axes of the two rotors 304 and 306 are substantially collinear when the actuated hinges 312 and 313 are in a fully open position, as illustrated in FIG. 3b. FIG. 3a illustrates the exemplary rotorcraft with actuated hinges 312 and 313 partially actuated. As with the first embodiment, actuated hinges 312 and 313 may be adapted to respond to electric servo motors, hydraulic actuators, shape memory actuators, electro-static actuators, or other means to provide torque to the inter-rotor angles.

The first and second motors 300 and 302 may be electric, internal combustion, or other types of motors. In this exemplary embodiment, as in the embodiment of FIG. 2, the first and second motors 300 and 302 are not mounted on the hinged frame of the rotorcraft collinearly with the rotors, as illustrated in the exemplary embodiment of FIG. 1. Instead the motors 300 and 302 are mounted adjacent to rotors 304 and 306 in motor mounts 308 and 310 on hinged frame 350. In a preferred embodiment, the first and second motors 300 and 302 are coupled to bearings 340 and 342 by a transmission (not shown). This transmission may include gears, friction wheels, pulleys, sprockets, chains, belts, drive shafts, joints, and/or other transmission means known in the art. Bearings 340 and 342 in turn transfer the torque applied by motors 300 and 302 to rotors 304 and 306 in order to rotate rotors 304 and 306.

In this configuration, because rotors 304 and 306 are designed to counter-rotate in operation, the horizontal facing of the exemplary rotorcraft may be maintained by operating the first and second rotors 304 and 306 such that speeds are constant and the torques that results from the drag from the rotation of each rotor are substantially equal and opposite, and yaw of the exemplary rotorcraft may be controlled by controlling the rotational speeds of rotors 304 and 306. It may instead be desirable that the moment of inertia of first rotor 304 be different from the combined moment of inertia of second rotor 306. This configuration may enable the rotorcraft to achieve greater attitude stability during operation.

As with the embodiment of FIG. 1, the exemplary rotorcraft of FIGS. 3a-3h also includes control circuitry coupled to the first and second motors and the first and second actuated hinges 312 and 313 to provide flight control. This coupling may be by direct electrical coupling or it may be accomplished wirelessly, mechanically (as in the case of the throttle of an internal combustion engine), or by other means. The control circuitry of the exemplary rotorcraft desirably includes flight control circuitry which is coupled to first motor control circuitry, second motor control circuitry, first hinge control circuitry, and second hinge control circuitry. The first and second motor control circuitries control the operation of the first and second motors and thereby controls the torque applied to the first and second rotors 304 and 306. The first motor control circuitry is coupled to first motor and adapted to control its rotational speed and thereby the rotational speed of rotor 304. The second motor control circuitry is coupled to second motor and adapted to control its rotational speed and thereby the rotational speed of rotor 306. The first and second motors may include sensors to monitor their rotational speeds to provide feedback to first and second motor control circuitry, respectively, to improve control of their rotational speed. The first and second hinge control circuitries are coupled to first and second actuated hinges 312 and 313 and adapted to control the first and second inter-rotor angles. First and second actuated hinges 312 and 313 may include a sensor to provide feedback regarding the inter-rotor angles.

As with the first embodiment, the flight control circuit is similarly adapted to generate lift control signals, yaw control signals, pitch control signals, and roll control signals. The lift control signals are supplied to the first motor control circuitry and the second motor control circuitry to provide control of the lift of the rotorcraft based on the sum of the rotational speeds of rotors 304 and 306. The yaw control signals are also supplied to the first and second motor control circuitry to control yaw of the rotorcraft based on the difference in the torque provided to rotors 304 and 306. Varying the rotational speeds of rotors 304 and 306 creates a difference in the magnitudes of drag and torque on the rotors 304 and 306 of the rotorcraft, which causes the rotorcraft to yaw. The pitch and roll control signals are supplied to the first and second hinge control circuitries to control pitch and roll of the rotorcraft based on variations of torques on the first and second inter-rotor angles.

Varying the first and second inter-rotor angles using the first and second actuated hinges 312 and 313 provides a torque to both rotors 304 and 306. This torque is applied approximately orthogonal to the angular momentum of each rotor. As described above, the application of a torque at an angle to the angular momentum of a rigid rotating body causes that body to respond by rotating along an axis that is orthogonal to both the axis of the angular momentum and the axis of the torque. This rule is employed, for example, by control moment gyroscopes (CMGs) in the control of spacecraft. As such, in the example of FIG. 3a, the torque applied by varying the inter-rotor angle in the X-Z plane by actuating actuated hinge 312 causes the exemplary rotorcraft to rotate about the X axis. Similarly, the torque applied by varying the inter-rotor angle in the Y-Z plane by actuating actuated hinge 313 causes the exemplary rotorcraft to rotate about the Y-axis. Thus, pitch and roll of the exemplary rotorcraft may be controlled by actuating actuated hinges 312 and 313. Additionally, the angular speed at which hinges 312 and 313 are actuated may be varied in order to control the pitch and roll of the exemplary rotorcraft. The larger the angular speed at which a hinge 312 or 313 is actuated, the larger in magnitude the effect on pitch or roll.

The hinged frame 350 of such an exemplary rotorcraft may also include a housing to enclose the hinged frame assembly and configured such that the first and second rotors are ducted. Ducting of counter-rotating rotors 304 and 306 may increase lift and/or improve stealth capabilities of the exemplary rotorcraft. Additionally, for example, hinged frame 350 may also include rotor-guards substantially as described above. Additionally, hinged frame 350 or the housing attached thereto may provide a stable platform that may be coupled to a payload, which could include a pilot, one or more passengers, cargo and/or additional rotorcraft components, such as a fuel tank, a battery, sensors, and/or weapons. As indicated above, the concentric configuration of rotors 304 and 306 allows the center of mass of the rotorcraft (and consequently rotors 304 and 306) to remain constant during operation of the rotorcraft. This configuration thereby improves the stability of the rotorcraft when carrying a payload.

In an alternative embodiment, faster and larger control over lift and yaw may be achieved by adjusting the blade pitch of the first and second rotors. The exemplary rotorcraft may include one or two swash plates corresponding to one or both rotors. The swash plate(s) may be configured to collectively change the blade pitch of the corresponding rotor. A change in blade pitch increases or decrease lift generated by the corresponding rotor. Additionally, a change in blade pitch increases or decreases the drag on the corresponding rotor. A change in drag may change the rotational speed of the corresponding rotor, and affect the torque applied by the rotor to the rotorcraft, causing the rotorcraft to yaw. Because the first and second rotors are configured for adjustment by the first and second actuated hinges, the swash plate(s) may not be required to provide cyclic control to the first and second rotors.

Figure 4:
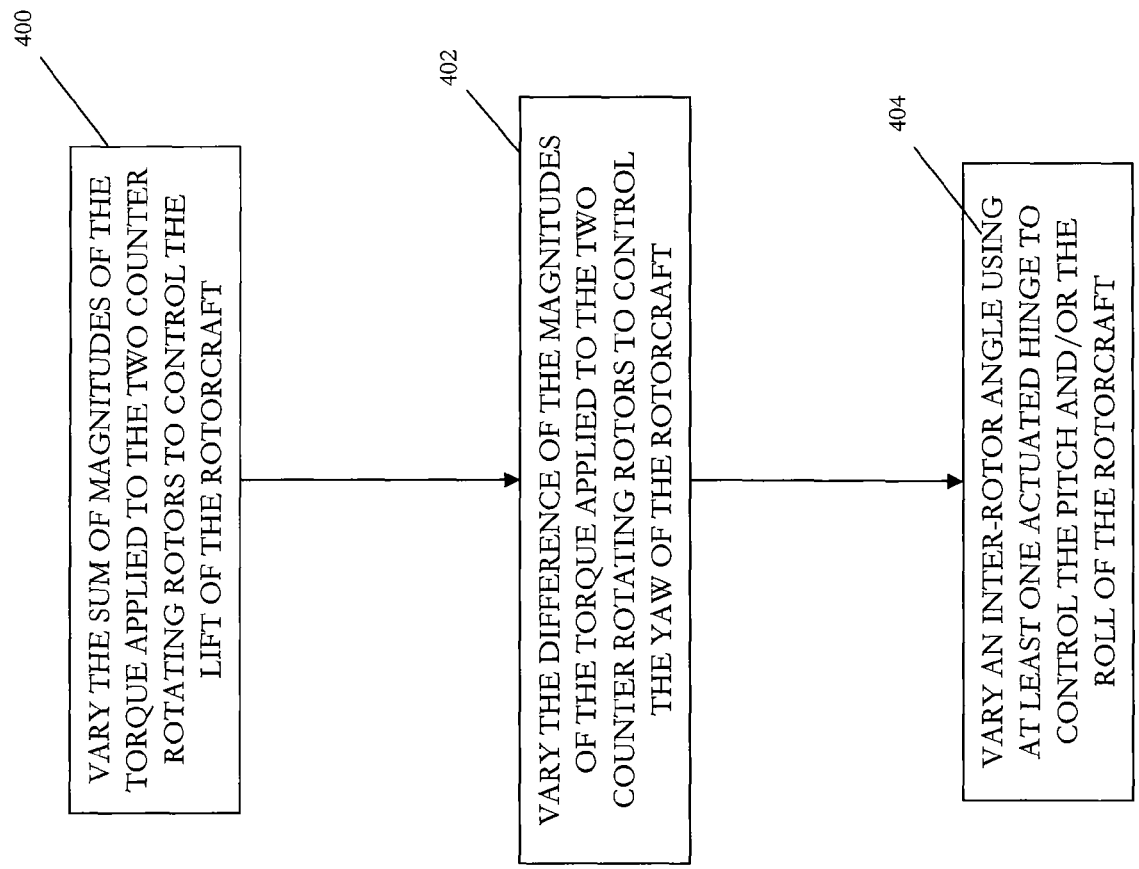
FIG. 4 is a flowchart illustrating an exemplary method for inertially controlling a rotorcraft with two counter-rotating rotors according to the present invention.

FIG. 4 illustrates an exemplary method for inertially controlling a rotorcraft with two counter-rotating rotors. The rotorcraft to be controlled includes a hinged frame that is configured such that an inter-rotor angle between rotational axes of the two counter-rotating rotors is controlled by at least one actuated hinge of the hinged frame, such as the exemplary rotorcrafts of FIGS. 1-3h. As in the exemplary rotorcraft of FIG. 1, it is desirable for the rotational axes of the two counter-rotating rotors to be substantially collinear when the actuated hinge is in its fully open position.

The sum of magnitudes of the torque applied to the two counter-rotating rotors is varied to control the lift of the rotorcraft, step 400. The difference of the magnitudes of the torque applied to the two counter-rotating rotors is varied to control the yaw of the rotorcraft, step 402. These torques may be desirably applied to the counter-rotating rotors by a pair of motors that are rigidly coupled to the hinged frame, as in the exemplary rotorcraft of FIG. 1. However, it is contemplated that the torques be applied to the counter-rotating rotors by a pair of motors coupled instead to alternate frames, such as frames movable with the rotors.

At least one inter-rotor angle is varied using the at least one actuated hinge to control the pitch and/or the roll of the rotorcraft, step 404, as described above with reference to the exemplary rotorcraft of FIGS. 1-3$h$.

Alternately, pitch or roll of the rotorcraft may be mimicked by varying the yaw and the roll or pitch of the rotorcraft in combination.

The horizontal speed of the rotorcraft may be controlled by varying the lift of the rotorcraft and the pitch of the rotorcraft in combination.

As described above, the exemplary embodiments of the present invention use inertia to control the pitch and roll of a rotorcraft. The exemplary rotorcrafts described above may be used for controlled flight in simulated or actual real-world environments. Additionally, it is contemplated the exemplary rotorcrafts described above may be used as control models for flying rotorcraft to demonstrate control of the rotorcraft through the generation of the described inertial forces.

The present invention includes a number of exemplary rotorcraft and methods of inertial control of these rotorcraft. Although the invention is illustrated and described herein with reference to specific embodiments, it is not intended to be limited to the details shown. Rather, various modifications may be made in the details within the scope and range of equivalents of the claims and without departing from the invention.

What is claimed is:

1. A rotorcraft, comprising:
   a first motor coupled to a first rotor, the first rotor being a right-hand rotor;
   a second motor coupled to a second rotor, the second rotor being a left-hand rotor;
   a hinged frame, a first motor mount configured to rigidly hold the first motor, and a second motor mount configured to rigidly hold the second motor, the hinged frame including at least one actuated hinge to vary at least one inter-rotor angle of the first and second rotors, the at least one actuated hinge configured such that the rotational axes of the first and second rotors are substantially collinear when the at least one actuated hinge is in a fully open position; and
   control circuitry coupled to the first motor, the second motor, and the at least one actuated hinge,
   wherein a center of mass of the first rotor is located at substantially the same position as a center of mass of the second rotor.

2. A rotorcraft according to claim 1, wherein the centers of mass of the first rotor and the second rotor are located at substantially the same position as a center of mass of the rotorcraft.

3. A rotorcraft according to claim 2, wherein the first rotor and the second rotor are concentric.

4. A rotorcraft according to claim 3, wherein the first rotor and second rotor rotate in the same plane when the at least one actuated hinge is in a fully open position.

5. A rotorcraft according to claim 2, wherein the hinged frame of the rotorcraft is adapted to be coupled to a payload.

6. A rotorcraft according to claim 1, wherein the at least one actuated hinge of the hinged frame is adapted to be coupled to a payload.

7. A rotorcraft according to claim 1, wherein the hinged frame includes a housing configured such that the first rotor and second rotor are ducted.

8. A rotorcraft according to claim 7, wherein the housing of the hinged frame is adapted to be coupled to a payload.

9. A rotorcraft according to claim 1, wherein the hinged frame includes:
   a first rotor-guard configured to substantially protect the first rotor from collisions with environmental objects; and
   a second rotor-guard configured to substantially protect the second rotor from collisions with environmental objects.

10. A rotorcraft according to claim 1, wherein the at least one actuated hinge comprises a first actuated hinge and a second actuated hinge.

11. A rotorcraft according to claim 10, wherein the at least one inter-rotor angle of the first and second rotors comprises an inter-rotor angle of the first rotor and an inter-rotor angle of the second rotor and wherein the first actuated hinge varies the inter-rotor angle of the first rotor and the second actuated hinge varies the inter-rotor angle of the second rotor.

12. A rotorcraft according to claim 11, wherein the inter-rotor angles of the first and second rotors are not coplanar.

13. A rotorcraft according to claim 12, wherein the inter-rotor angles of the first and second rotors are in substantially perpendicular planes.

14. A rotorcraft according to claim 1, wherein the control circuitry includes:
   first motor control circuitry coupled to the first motor to control a first rotational speed of the first rotor;
   second motor control circuitry coupled to the second motor to control a second rotational speed of the second rotor; and
   hinge control circuitry coupled to the at least one actuated hinge to control the at least one inter-rotor angle.

15. A rotorcraft according to claim 14, wherein:
   the control circuitry further includes flight control circuitry coupled to the first motor control circuitry, the second motor control circuitry, and the hinge control circuitry; and
   the flight control circuitry is adapted to:
   supply lift control signals to the first motor control circuitry and the second motor control circuitry to control lift of the rotorcraft;
   supply yaw control signals to the first motor control circuitry and the second motor control circuitry to control yaw of the rotorcraft;
   supply pitch control signals to the hinge control circuitry to control pitch of the rotorcraft; and
   supply roll control signals to the hinge control circuitry to control roll of the rotorcraft.

16. A rotorcraft according to claim 15, wherein the lift control signals for controlling lift of the rotorcraft comprise signals to vary a sum of magnitudes of torque applied to the first and second rotors.

17. A rotorcraft according to claim 15, wherein the yaw control signals for controlling yaw of the rotorcraft comprise signals to vary a difference of magnitudes of torque applied to the first and second rotors.

18. A rotorcraft according to claim 15, wherein the pitch control signals for controlling pitch of the rotorcraft comprise signals to vary a first of the at least one inter-rotor angles.

19. A rotorcraft according to claim 18, wherein the roll control signals for controlling roll of the rotorcraft comprise signals to vary a second of the at least one inter-rotor angles.

20. A rotorcraft, comprising:
a first motor coupled to a housing;
a first rotor coupled to the first motor by a first transmission, the first rotor being a right-hand rotor;
a second motor coupled to the housing;
a second rotor coupled to the second motor by a second transmission, the second rotor being a left-hand rotor;
a hinged frame, a first rotor mount configured to rigidly hold the first rotor, and a second rotor mount configured to rigidly hold the second rotor, the hinged frame including at least one actuated hinge coupled to the housing, the at least one actuated hinge:
disposed between the first rotor mount and the second rotor mount to vary at least one inter-rotor angle of the first and second rotors; and
configured such that the first rotational axis and the second rotational axis are substantially collinear when the actuated hinge is in a fully open position; and
control circuitry coupled to the first motor, the second motor, and the at least one actuated hinge,
wherein a center of mass of the first rotor is located at substantially the same position as a center of mass of the second rotor.

21. A rotorcraft, comprising:
a first motor coupled to a first rotor, the first rotor being a right-hand rotor;
a second motor coupled to a second rotor concentric with the first rotor, the second rotor being a left-hand rotor;
a hinged frame, a first motor mount configured to rigidly hold the first motor, and a second motor mount configured to rigidly hold the second motor, the hinged frame including a first actuated hinge to vary an inter-rotor angle of the first rotor, and a second actuated hinge to vary an inter-rotor angle of the second rotor, the first and second actuated hinges configured such that the first and second rotors are substantially coplanar and the rotational axes of the first and second rotors are substantially collinear when the first and second actuated hinges are a fully open position; and
control circuitry coupled to the first motor, the second motor, and the first and second actuated hinges.

22. A rotorcraft according to claim 21, wherein the control circuitry includes:
first motor control circuitry coupled to the first motor to control a first rotational speed of the first rotor;
second motor control circuitry coupled to the second motor to control a second rotational speed of the second rotor;
first hinge control circuitry coupled to the first actuated hinge to control the inter-rotor angle of the first rotor; and
second hinge control circuitry coupled to the second actuated hinge to control the inter-rotor angle of the second rotor.

23. A rotorcraft according to claim 22, wherein:
the control circuitry further includes flight control circuitry coupled to the first motor control circuitry, the second motor control circuitry, the first hinge control circuitry, and the second hinge control circuitry; and
the flight control circuitry is adapted to:
supply lift control signals to the first motor control circuitry and the second motor control circuitry to control lift of the rotorcraft;
supply yaw control signals to the first motor control circuitry and the second motor control circuitry to control yaw of the rotorcraft;
supply pitch control signals to the first hinge control circuitry to control pitch of the rotorcraft; and
supply roll control signals to the second hinge control circuitry to control roll of the rotorcraft.

24. A rotorcraft according to claim 23, wherein the lift control signals for controlling lift of the rotorcraft comprise signals to vary a sum of magnitudes of torque applied to the first and second rotors.

25. A rotorcraft according to claim 23, wherein the yaw control signals for controlling yaw of the rotorcraft comprise signals to vary a difference of magnitudes of torque applied to the first and second rotors.

26. A rotorcraft according to claim 23, wherein the pitch control signals for controlling pitch of the rotorcraft comprise signals to vary the inter-rotor angle of the first rotor.

27. A rotorcraft according to claim 23, wherein the roll control signals for controlling roll of the rotorcraft comprise signals to vary the inter-rotor angle of the second rotor.

28. A rotorcraft according to claim 21, further comprising:
a first housing frame containing a first bearing coupled to the first rotor; and
a second housing frame containing a second bearing coupled to the second rotor;
wherein the first motor is coupled to the first bearing and the second motor is coupled to the second bearing; and
wherein the first actuated hinge varies the inter-rotor angle of the first rotor by rotating the first housing frame and the second actuated hinge varies the inter-rotor angle of the second rotor by rotating the second housing frame.

* * * * *